United States Patent
Yoo et al.

(10) Patent No.: US 12,542,573 B2
(45) Date of Patent: *Feb. 3, 2026

(54) ELECTRONIC DEVICE CAPABLE OF WIRELESS POWER CONTROL AND OPERATING METHOD THEREOF

(71) Applicant: Samsung Electronics Co., Ltd., Suwon-si (KR)

(72) Inventors: Kyungwoo Yoo, Suwon-si (KR); Dooseok Choi, Suwon-si (KR); Hyung Sun Lim, Suwon-si (KR); Joonhoi Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

This patent is subject to a terminal disclaimer.

(21) Appl. No.: 18/223,310

(22) Filed: Jul. 18, 2023

(65) Prior Publication Data
US 2024/0072833 A1 Feb. 29, 2024

(30) Foreign Application Priority Data
Aug. 30, 2022 (KR) .................. 10-2022-0109387

(51) Int. Cl.
*H04B 1/38* (2015.01)
*G01S 7/00* (2006.01)
(Continued)

(52) U.S. Cl.
CPC .............. *H04B 1/38* (2013.01); *G01S 13/04* (2013.01); *H04W 52/18* (2013.01); *G01S 7/006* (2013.01)

(58) Field of Classification Search
CPC ........ H04B 1/38; H04B 17/328; H04B 17/18; H04B 17/19; H04B 17/102; H04B 1/3838; H04B 17/318; H04B 17/103; H04B 1/06; H04B 1/40; H04B 7/005; G01S 13/04; G01S 7/006; G01S 3/783; G01S 7/352; G01S 7/356; G01S 7/4013; G01S 13/06;
(Continued)

(56) References Cited

U.S. PATENT DOCUMENTS 7,146,139 B2 12/2006 Nevermann
8,254,800 B2 8/2012 Oyoshi
(Continued)

FOREIGN PATENT DOCUMENTS

JP 5748635 B2 7/2015
WO 2019/190914 A1 10/2019

OTHER PUBLICATIONS

Communication dated on Feb. 8, 2024 issued by the European Patent Office in European Patent Application No. 23182194.3.

*Primary Examiner* — Lana N Le
(74) *Attorney, Agent, or Firm* — Sughrue Mion, PLLC (57) ABSTRACT

An electronic device is provided. The electronic device includes: a transceiver configured to transmit and receive a wireless signal; and a processor configured to: control a measurement circuit to identify a transmission/reception power ratio of the wireless signal; control a converter to transform the transmission/reception power ratio into frequency domain data; detect whether an object is adjacent the electronic device, based on the frequency domain data and an adjustable threshold; and control the transceiver based on whether the object is detected adjacent the electronic device.

20 Claims, 9 Drawing Sheets

(51) Int. Cl.
*G01S 13/04* (2006.01)
*H04W 52/18* (2009.01)

(58) Field of Classification Search
CPC . H04W 52/18; H04W 52/146; H04W 52/367; H04W 52/283; H04W 52/28; H04W 52/241; H04W 52/36
See application file for complete search history.

(56) References Cited

U.S. PATENT DOCUMENTS

| | | | |
|---|---|---|---|
| 9,026,059 | B2 | 5/2015 | Shi et al. |
| 9,247,508 | B2 * | 1/2016 | Khoshnevis ........ H04W 52/367 |
| 9,867,139 | B1 * | 1/2018 | Khasgiwala ......... H04B 17/318 |
| 10,425,171 | B2 | 9/2019 | Seyed et al. |
| 10,681,651 | B1 | 6/2020 | Govindswamy et al. |
| 11,194,032 | B2 | 12/2021 | Cetinoneri et al. |
| 2009/0023466 | A1 * | 1/2009 | Sutivong ............... H04W 52/36 455/69 |
| 2020/0068510 | A1 * | 2/2020 | Martin ................ H04W 52/146 |
| 2020/0382162 | A1 * | 12/2020 | Park ........................ H04B 1/40 |
| 2021/0376664 | A1 * | 12/2021 | Park .................... H04W 52/283 |
| 2024/0069184 | A1 * | 2/2024 | Yoo ......................... G01S 7/356 |

* cited by examiner

FIG. 10

ELECTRONIC DEVICE CAPABLE OF WIRELESS POWER CONTROL AND OPERATING METHOD THEREOF

CROSS-REFERENCE TO RELATED APPLICATION

This application claims priority under 35 U.S.C. § 119 to Korean Patent Application No. 10-2022-0109387, filed on Aug. 30, 2022, in the Korean Intellectual Property Office, the disclosure of which is incorporated by reference herein in its entirety.

BACKGROUND

The present disclosure relates to an electronic device for controlling wireless power and an operating method thereof.

International organizations, such as the Federal Communications Commission (FCC) and the International Commission on Non-Ionizing Radiation Protection (ICNIRP), regulate the exposure of a radio wave mainly based on a Specific Absence Rate (SAR) and a Power Density (PD). In particular, of electromagnetic waves in a millimeter-wave (mmWave) band may be absorbed into the surface of a human body due to the high frequency characteristics thereof. Therefore, for mmWave, the international organizations provide PD radio wave exposure standards.

Because the PD is proportional to the power (effective isotropic radiated power (EIPR)) transmitted from a terminal, the terminal may forcibly reduce the power transmitted to comply with the exposure standards and reduce absorption of the electromagnetic waves into the human body. In particular, electronic devices, such as smartphones, may transmit signals with limited power to satisfy an electromagnetic wave exposure standard for the human body. However, because there is no way to detect the human body within a short distance of the electronic devices, a low signal-to-noise ratio (SNR) may be caused due to unnecessary restriction of transmission power. Accordingly, the communication connection may not be effective, and the terminal may not be efficiently used, due to the low SNR.

SUMMARY

Embodiments of the present disclosure provide an electronic device for detecting an object, such as a human body, in a short distance, and for controlling the power of a transmission signal when the human body is detected, thereby effectively making communication, and an operating method thereof.

According to an aspect of an example embodiment, an electronic device includes: a transceiver configured to transmit and receive a wireless signal; and a processor configured to: control a measurement circuit to identify a transmission/reception power ratio of the wireless signal; control a converter to transform the transmission/reception power ratio into frequency domain data; detect whether an object is adjacent the electronic device, based on the frequency domain data and an adjustable threshold; and control the transceiver based on whether the object is detected adjacent the electronic device.

According to an aspect of an example embodiment, an operating method performed by an electronic device, includes: identifying a transmission/reception power ratio of a wireless signal; transforming the transmission/reception power ratio into frequency domain data; detecting whether an object is adjacent the electronic device, based on the frequency domain data and an adjustable threshold; and controlling transmission power of the wireless signal, based on whether the object is detected adjacent the electronic device.

According to an aspect of an example embodiment, an electronic device includes: a transceiver configured to transmit and receive a wireless signal; and a processor configured to: measure a transmission/reception power ratio of the wireless signal; transform the transmission/reception power ratio into frequency domain data; detect whether an object is adjacent the electronic device, based on the frequency domain data and an adjustable threshold; and control the transceiver based on whether the object is detected adjacent the electronic device.

BRIEF DESCRIPTION OF DRAWINGS

The above and other aspects and features of the present disclosure will be more clearly understood from the following description of example embodiments, taken in conjunction with the accompanying drawings, in which.

DETAILED DESCRIPTION

Hereinafter, example embodiments will be described with reference to the accompanying drawings.

An electronic device according to various example embodiments may be configured to detect an object including a human body or other things, and control power of a wireless signal based on a detection result.

Figure 1:
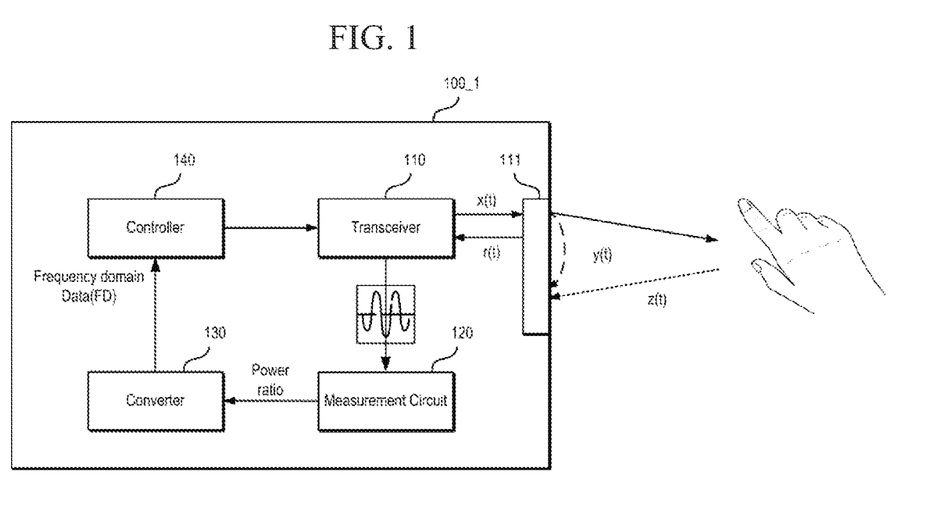
FIG. 1 illustrates an electronic device according to an example embodiment.

FIG. 1 illustrates an electronic device, according to an example embodiment.

Referring to FIG. 1, an electronic device 100_1 according to an example embodiment includes a transceiver 110, a measurement circuit 120, a converter 130, and a controller 140.

The transceiver 110 is connected to various wireless communication systems supporting multiple-input and multiple-output (MIMO), which is a multi-antenna technology, for example, a Long Term Evolution (LTE) system, a LTD Advanced (LTE-A) system, an LTE-A Pro system, or a 5G system suggested in the 3rd Generation Partnership Project (3GPP), and transmits or receives a wireless signal together with a terminal and a base station. The wireless signal may include various control information and data.

The transceiver 110 may include a transmitter which up-converts and amplifies the frequency of a signal transmitted, and a receiver which low-noise amplifies and down-converts a frequency of a signal received.

The transceiver 110 may be variously configured to transmit and receive a wireless signal through an antenna 111, and may be implemented through, for example, various schemes, such as Intermediate Frequency ICs (IFICs) or Radio Frequency ICs (RFICs). The antenna may include, for example, a patch antenna, a patch antenna array, or various types of antennas used in a wireless device.

A transmission signal "x(t)" is transmitted through the transceiver 110, and a portion of the transmission signal "x(t)" may be reflected from the object and received by the transceiver 110. In this case, a signal reflected from the object may be referred to as a reflection signal "z(t)". In addition, due to incompleteness and characteristics of the transmitter, the portion of the transmission signal "x(t)" may be coupled to the receiver. In this case, the portion of the transmission signal "x(t)" coupled to the receiver may be referred to as a leakage signal "y(t)". The receiver may receive and process a reception signal "r(t)" including the above-described reflection signal "z(t)", the leakage signal "y(t)" and noise "n(t)". Hereinafter, the reception signal "r(t)" may be defined as a signal including the reflection signal "z(t)", the leakage signal "y(t)", and any noise "n(t)".

The measurement circuit 120 measures a transmission/reception power ratio from a wireless signal. For example, the measurement circuit 120 may measure the transmission/reception power ratio based on the transmission signal "x(t)" and the reception signal "r(t)". The transmission/reception power ratio may be defined as a reflection coefficient "F", and may be a value defined as a ratio between transmission power and reception power at a specific position. The reflection coefficient may be changed together with the change in the surrounding environment. For example, a change in the reflection coefficient may be made due to an object present in a short distance to the electronic device 100_1.

The measurement circuit 120 may calculate a ratio "$E[|r(t)|^2]/E[|x(t)|^2]$" of power of the reception signal "r(t)" to power of the transmission signal "x(t)" as the transmission/reception power ratio. In this case, "E[ ]" may be an equation for calculating power or electrical energy of "[ ]". In addition, "$E[|r(t)|^2]$" is an equation for calculating the power of the above-described reception signal "r(t)". As described above, the reception signal "r(t)" may include the power of the reflection signal "z(t)" from the object, the leakage signal "y(t)" coupled from the transmitter to the receiver, and other noises. Accordingly, the transmission/reception power ratio calculated by the measurement circuit 120 may be mainly changed by an adjacent object (a near object) due to components included in the reception signal "r(t)".

The converter 130 transforms the transmission/reception power ratio, which is measured by the measurement circuit 120, into frequency domain data (FD). The converter 130 may transform a transmission/reception power ratio calculated in the time domain into frequency domain data through Fourier transform. For example, the converter 130 may transform the transmission/reception power ratio, which is calculated in a time domain, into the frequency domain data through discrete Fourier transform (DFT) defined as $$DFT(s'[n]) = DFT\left(s[n] - \frac{1}{N}\sum_{n=0}^{N-1} s[n]\right) = \sum_{n=0}^{N-1} s'[n]\exp(-j2\pi mn/N).$$

In this case, "s[n]" refers to the transmission/reception power ratio in an n-th time sample defined in the time domain (specifically, a discrete time domain), "N" refers to the total number of time samples subject to the discrete Fourier transform, and "s'[n]" refers to a value obtained by subtracting a mean value from "s[n]".

The operation of the discrete Fourier transform of the converter 130 described above is provided as an example. According to various other example embodiments, the converter 130 may transform the transmission/reception power ratio into frequency domain data through various Fourier transforms such as fast Fourier transform.

The converter 130 according to an example embodiment may perform Fourier transform, after removing a DC component from a transmission/reception power ratio or may remove the DC component from the Fourier-transformed frequency domain data. Accordingly, only a component for the change in the transmission/reception power ratio may be clearly analyzed in the frequency domain. In addition, because a basic value of the transmission/reception power ratio may be changed under various environments depending on the object, an offset variation resulting from such an environmental change may also be removed.

The transmission/reception power ratio transformed into the frequency domain data shows different characteristics depending on the movement of the object and depending on a frequency band. For example, when the object is a dielectric substance, such as a human body, the frequency domain data may have different characteristics when the object is not present, when the object is present and does not move, and when the object is present and moves. Accordingly, the transmission/reception power ratio data transformed in the frequency domain may be utilized in detecting the object. However, in the frequency domain, the characteristic of a high frequency area may not be changed under various situations resulting from the movement of the object, when compared to another frequency area. Therefore, it may be assumed that main frequency components of the transmission/reception power ratio are present in another band, instead of the high frequency area. In this case, components of the high frequency area may be considered as noise.

The controller 140 may be configured to detect an adjacent object based on the frequency domain data, which is obtained by the converter 130, and an adjustable threshold, and to control the transceiver 110 depending on the detection result of the object.

The controller 140 according to an example embodiment may perform an operation of detecting an object by considering frequency domain characteristics of the transmission/reception power ratio in the frequency domain, which is transformed by the converter 130. Specifically, the controller 140 may variously set an adjustable threshold, based on the frequency domain characteristic of the transmission/reception power ratio to detect a near object.

According to an example embodiment, the controller 140 may calculate a noise level based on a noise frequency area, which is regarded as noise, in the above-described frequency domain data, and may set the adjustable threshold based on the calculated noise level and a tuning parameter. In this case, the threshold may be an adjustable parameter, as the tuning parameter is adjusted by the controller 140 at the calculated noise level. The controller 140 may variously set the threshold by adjusting the tuning parameter.

The controller 140 according to an example embodiment may set the threshold with a value suitable for distinguishing between frequency domain data, which corresponds to a situation that an object is absent, and frequency domain data, which corresponds to a situation that the object is stationary or moved, based on the frequency domain characteristic of the frequency domain data.

When the frequency domain data exceeds the adjustable threshold, the controller 140 may determine a near object as being present. Alternatively, when the frequency domain data is less than or equal to the adjustable threshold, the controller 140 may determine the near object as being absent.

The controller 140 may perform an operation of detecting an object according to example embodiments described above, and may control the transceiver 110 based on whether the object is detected. For example, the controller 140 may control the transceiver 110 to transmit the wireless signal with first power, when the object is determined as being present, and may control the transceiver 110 to transmit the wireless signal with second power greater than the first power, when the object is determined as being absent.

For example, the second power may be greater than the first power by 4 dB. The transmission/reception power ratio may be greatly affected by a dielectric substance positioned within several cm (e.g., 2 cm) due to the characteristics of a physical value. In this regard, the transmission/reception power ratio may not be relatively greatly affected by the dielectric substance in an area, which is outside a range of several cm. Accordingly, the presence of the human body may be determined as absent from the short distance. Accordingly, the controller 140 may control the transceiver 110 such that the transceiver 110 transmits the wireless signal with the second power greater than the first power by 4 dB, when the object is determined as being absent from the short distance.

Alternatively, the controller 140 may set the strength of the second power based on a standard or regulation, such as the FCC regulation or other various standards defining power regulations of the wireless signal for a human body, in addition to 4 dB.

As described above, according to an example embodiment, the electronic device may detect the near object by utilizing the frequency domain data of the transmission/reception ratio, which shows different characteristics depending on the situations of the object, and the adjustable threshold. The power of the transmission signal may be controlled to satisfy a power exposure regulation such as FCC depending on the detection result, thereby improving the communication efficiency.

Hereinafter, the detailed operations of the controller 140 will be described according to various example embodiments.

Figure 2A:
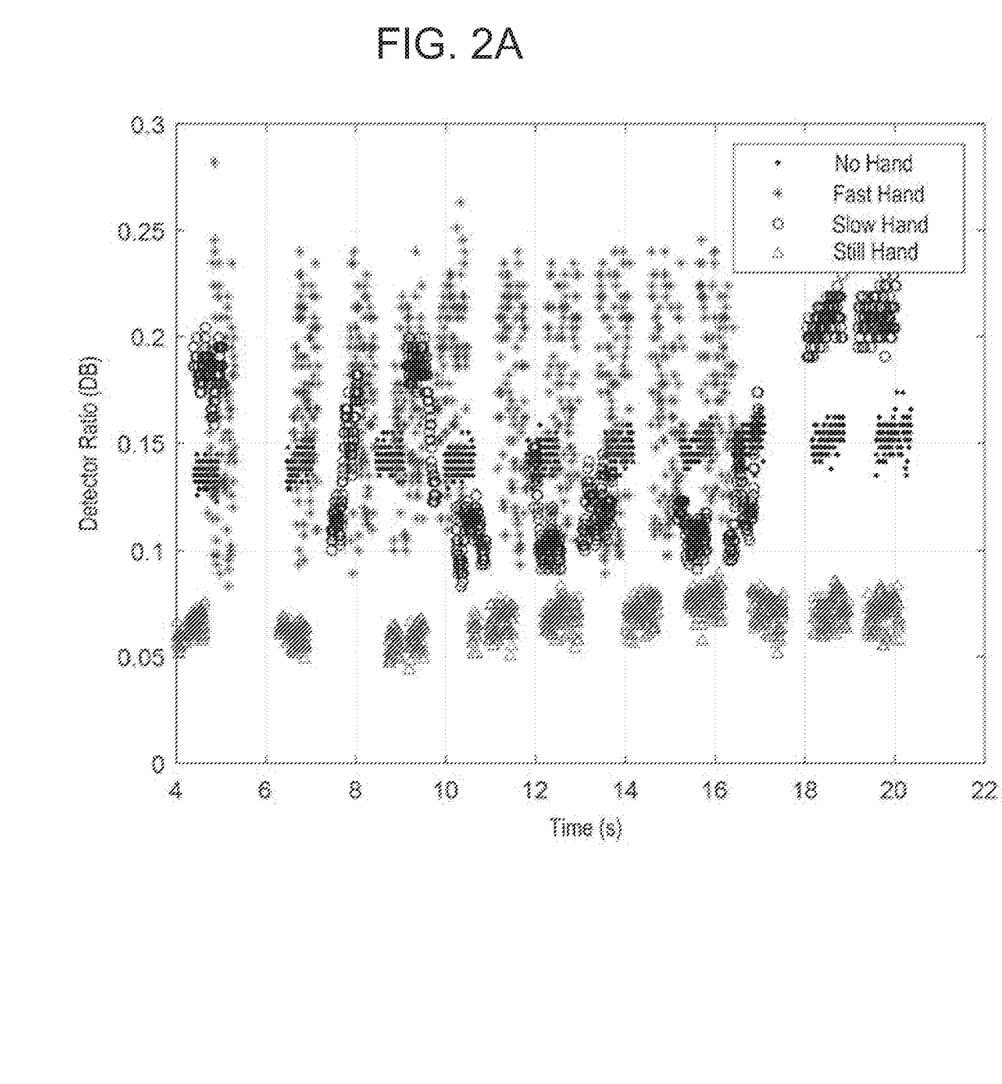
FIGS. 2A and 2B are graphs illustrating a transmission/reception power ratio in a time domain and a frequency domain, respectively, according to example embodiments.
Figure 2B:
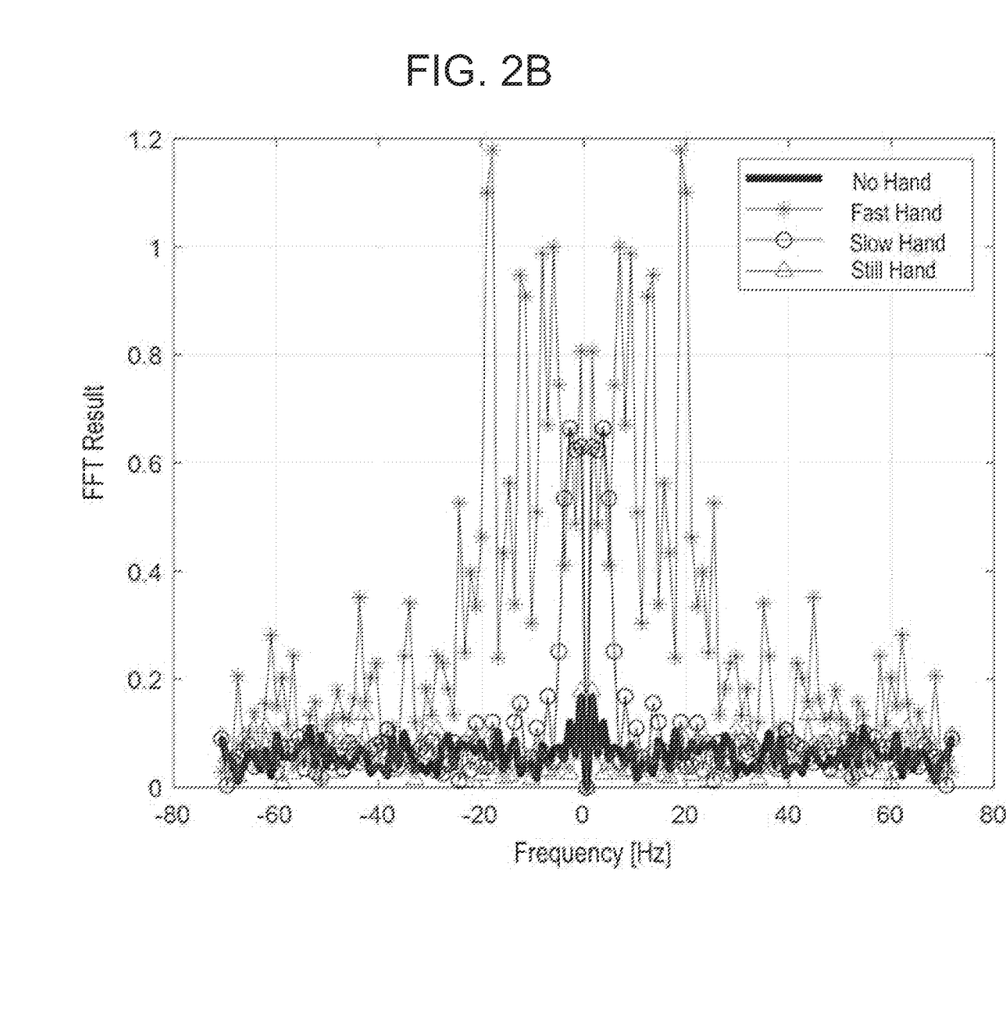

FIGS. 2A and 2B are graphs illustrating a transmission/reception power ratio in a time domain and a frequency domain, respectively. In this case, the transmission/reception power ratio is measured when the object is a human hand.

Referring to FIG. 2A, the transmission/reception power ratio may be measured depending on various situations that an object is changed. For example, various situations may include a situation (no hand) that a human body is absent from a short distance to the electronic device 100_1, a situation (fast hand) that the human body moves fast, a situation (slow hand) that the human body moves slowly, or a situation (still hand) that the human body is stationary.

The measurement circuit 120 may measure "N" number of transmission/reception power ratios at specific time intervals. Because the transmission/reception power ratio is measured between transmission/reception wireless signals, time intervals in which the transmission/reception power ratio is not measured may be varied depending on the situations.

As illustrated, the transmission/reception power ratio is variously changed in the time domain depending on various situations of the object. In particular, when the human body moves, the transmission/reception power ratio is noticeably changed over time, as compared to the situation that the human body is absent or the situation that the human body is present and still. Accordingly, it may be recognized that the distribution of the transmission/reception power ratios is greatly made. It may be estimated that the characteristic of the transmission/reception power ratio in the time domain is reflected in the frequency domain.

Referring to FIG. 2B, which illustrates frequency domain data for the transmission/reception power ratio of FIG. 2A, it may be recognized that the situations in which the hand is present and moving (fast hand and slow hand) show stronger strength in specific frequency areas, when compared to other situations. To the contrary, it may be recognized that the transmission/reception ratios are uniformly distributed throughout the whole frequency areas under the situations in which the hand is present and still or not present (still hand and no hand) that the lower distribution is shown.

For example, when the human body moves slowly, the component of the low frequency area is greatly shown, instead of a DC component. When the human body moves fast, greater frequency domain data is present till the high frequency area. In addition, even when the human body does not move, a signal is detected in a low frequency area due to a fine change, instead of the DC component.

The signal strength is minimal in the high frequency domain except when the human body moves fast. Accordingly, it may be determined that the change in the transmission/reception power ratio resulting from the slow hand has no high frequency characteristic. In addition, even if the human body moves fast, the frequency component has a greater strength in the low frequency domain than in the high frequency domain. In summary, frequency domain data obtained in various environments as illustrated in FIG. 2B is less changed by the movement of the human body in a specific high frequency range, in common. Accordingly, it may be assumed that a component resulting from noise is mainly present in the high frequency area. Accordingly, the noise level may be estimated from the frequency domain data in the high frequency area.

For example, in FIG. 2B, when the set of frequency domain data included in the high frequency area is defined as a noise frequency area, the controller 140 may calculate the noise level, based on the noise frequency area. According to an example embodiment, the controller 140 may calculate the noise level based on the noise data, which corresponds to the nose frequency area of the frequency domain data, and based on $$\text{noise}(\underline{P}_k) = \frac{1}{N_{noise}} \sum_{m=1}^{N_{noise}} \underline{P}_k(m).$$

In this case, noise($P_k$) noise($P_k$) denotes the noise level, $N_{noise}$ denotes the coefficient of a discrete frequency component used when calculating the noise level, $P_k(m)$ $P_k(m)$ denotes frequency domain data, that is, Fourier-transformed result, at a "k" time, and "m" denotes a frequency index.

According to an example embodiment, the converter 130 may perform Fourier transform at a short sampling period (e.g., a sampling period defined below a set first threshold), such that the controller 140 calculates the noise level. When the moving speed of the human body increases, a high transmission/reception power ratio may exist in the high frequency area, which may cause an error in calculating the noise level. To the contrary, when Fourier transform is performed at the short sampling period according to example embodiments described above, only noise components may be present in the high frequency area, which may reduce an error in calculating the noise level. According to an example embodiment, the threshold for the above-described sampling period may be set based on the moving speed of the object.

The controller 140 may set the adjustable threshold based on the calculated noise level and the tuning parameter. The threshold is a parameter related to the noise level, and be adjusted in size, as the tuning parameter is adjusted. In this regard, the tuning parameter may be understood as a parameter for adjusting the size of the first threshold.

The controller 140 according to an example embodiment may adjust the threshold and the detection rate of the object by adjusting the tuning parameter.

Figure 3:
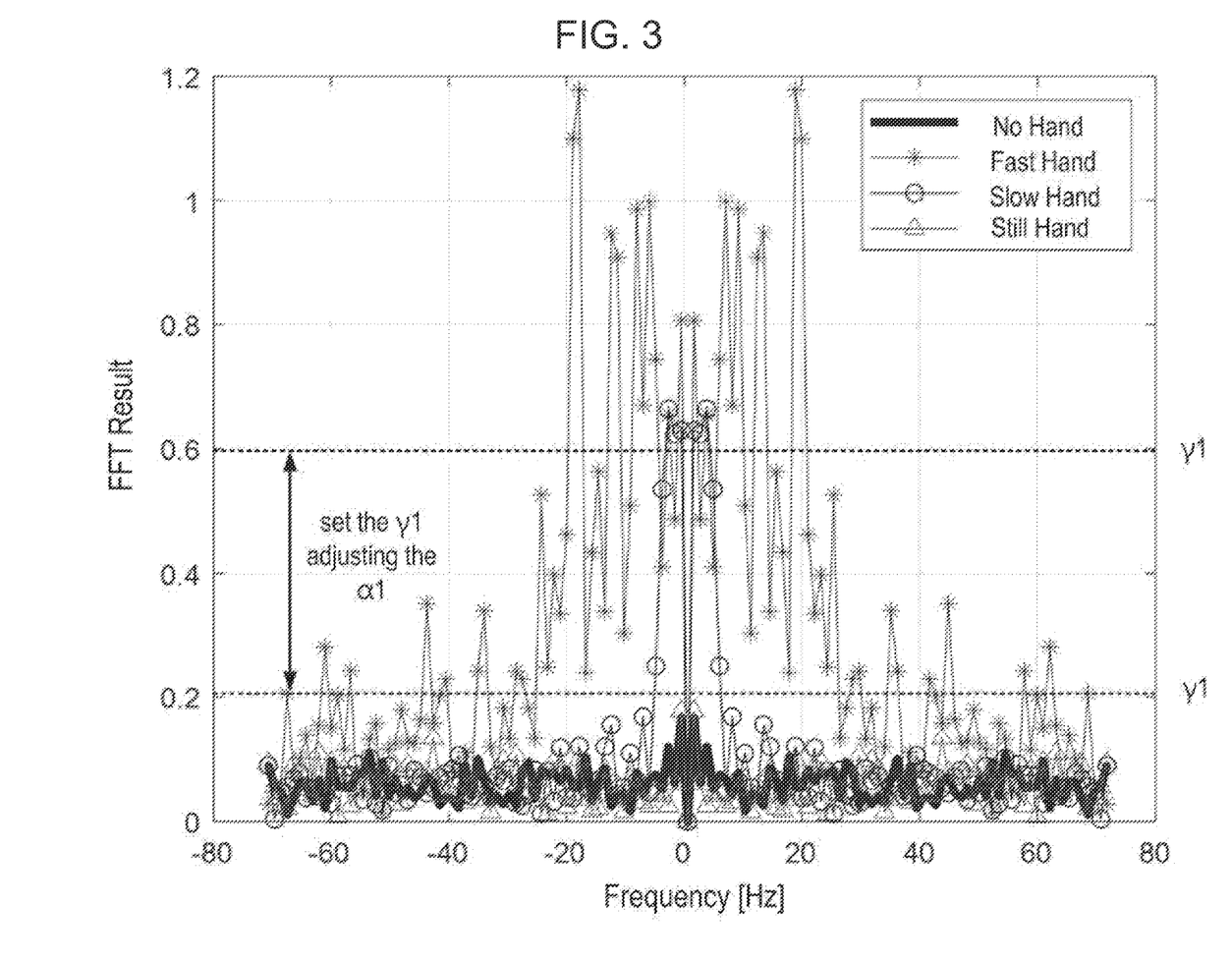
FIG. 3 illustrates an operation of adjusting a threshold, according to an example embodiment.

FIG. 3 illustrates an operation of adjusting a threshold, according to an example embodiment.

Referring to FIG. 3, according to an example embodiment, the controller 140 may set a threshold "γ" to a higher value by adjusting the tuning parameter "α" to a greater value, or may decrease the threshold to a lower value by adjusting the tuning parameter to a lesser value. When the tuning parameter is adjusted to the great value, the controller 140 may determine the object as being present, when there is frequency domain data having a greater value. Accordingly, even though the rate (non-detection rate) in which the object is not detected is relatively increased, the rate (erroneous detection rate) in which the object is erroneously detected may be decreased. To the contrary, when the tuning parameter is adjusted to the lesser value, the controller 140 may determine that an object is present even if there is relatively small frequency domain data, when compared to the case with a large first threshold. Accordingly, although the erroneous detection rate of the object is relatively increased, the non-detection rate may be decreased.

In this case, the non-detection rate for the object of the controller 140 may be the sensitivity for detecting the object. For example, when the controller 140 controls the transmission power of the transceiver 110 to be lowered, as the object is a human body, it is necessary to more sensitively detect the human body. Accordingly, the controller 140 may reduce the threshold by adjusting the tuning parameter to a lesser value, such that the non-detection rate is decreased.

As an example embodiment, when any human body is absent from the short distance and when the transmission/reception power ratio data follows or is assumed to follow Gaussian distribution in the time domain, the transmission/reception power ratio data follows chi-squared distribution in the frequency domain. Accordingly, the controller 140 may set the first threshold based on $\gamma = \alpha \overline{N\sigma^2}$. In this case, "γ" denotes the threshold, "α" denotes the tuning parameter, and $\overline{N\sigma^2}$ corresponds to the noise level described above, "N" denotes the total number of samples in the frequency domain, and "σ" refers to the standard deviation of the Gaussian distribution followed by the transmission/reception power ratio data in the time domain. The controller 140 may set "γ" by adjusting "α", and may adjust the erroneous detection rate and the non-detection rate of the object by adjusting "α" to a higher value or a lower value as described above.

As described above, according to an example embodiment, the electronic device 100_1 may adjust the erroneous detection rate and the non-detection rate of the object, as the threshold is variously set by adjusting the tuning parameter. When the threshold is set to a fixed value, and when the variance of the transmission/reception power ratio data changes due to the aging or deterioration of a terminal, or due to changes in the surrounding situation, the countermeasures against the situations is difficult. Accordingly, the probability in which an object is not detected or erroneously detected may be increased. However, as described above, the electronic device 100_1 according to an example embodiment may adaptively detect an object by identifying the threshold using a noise frequency area in which the influence of a surrounding dielectric substance, such as a human body, is minimal, and comparing the threshold with data in a low frequency area or an intermediate frequency area in which the influence by the dielectric substance is significant. In addition, when the object is a human body, the object should be detected more sensitively to satisfy various power regulations. In this case, the electronic device 100_1 may reduce the non-detection rate and detect the human body more sensitively, by reducing the first threshold by adjusting the tuning parameter to a lower level.

As described above, the controller 140 may set the threshold according to various example embodiments. The controller 140 sets the threshold and detects an object adjacent to the electronic device 100_1 based on the set threshold.

Figure 4:
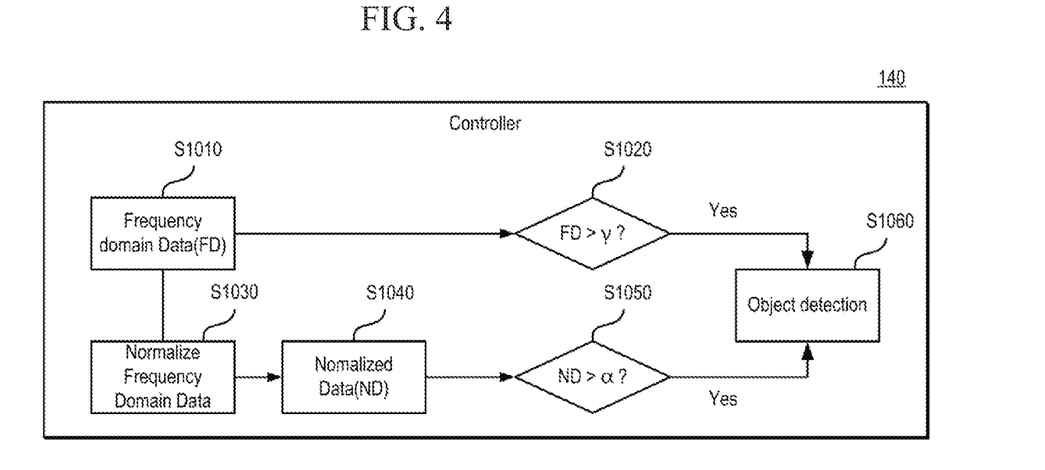
FIG. 4 is a flowchart illustrating an operation of detecting an object, according to an example embodiment.

FIG. 4 is a flowchart illustrating an operation of detecting an object, according to an example embodiment.

Referring to FIG. 4, the controller 140 may acquire the transformed frequency domain data FD from the converter 130 (S1010).

According to an example embodiment, the controller 140 determines whether the frequency domain data FD exceeds the adjustable threshold "γ" (S1020). When the frequency domain data FD exceeds the adjustable threshold "γ", the controller 140 may determine that an adjacent object is present, and when the frequency domain data FD is less than or equal to the adjustable threshold "γ", the controller 140 may determine the adjacent object as being absent (S1060). In this case, when at least one frequency component of the frequency domain data FD exceeds the adjustable threshold "γ", the controller 140 may determine the adjacent object as being present. In this regard, the controller 140 may determine the adjacent object as being present, when any one frequency component of the frequency domain data FD exceeds the adjustable threshold "γ".

Alternatively, the controller 140 according to an example embodiment may normalize the frequency domain data FD by using a noise level (S1030). For example, the controller 140 may normalize the frequency domain data FD by dividing the size of the frequency domain data FD by the noise level. The controller 140 may obtain normalized data ND through normalization (S1040). The controller 140 determines whether the normalization data ND exceeds the tuning parameter "α" (S1050). When the normalization data ND exceeds the tuning parameter "α", the controller 140 may determine the adjacent object as being present, and when the normalization data ND is less than or equal to the tuning parameter "α", the controller 140 may determine the adjacent object as being absent (S1060).

The controller 140 according to an example embodiment may perform the above-described operation of recognizing the object for a specific sample duration to accurately detect a human body which stationary or moves slowly enough to be determined as a DC component.

Specifically, when the object is the human body, the controller 140 may set a maximum sample interval ($T_{max}$, $s_{tan}$) defined as a maximum stop time of the human body. In this regard, the maximum sample interval ($T_{max}$, $s_{tan}$) refers to the maximum time period at which the human body may be completely stop. For example, the controller 140 may set the maximum sample interval ($T_{max}$, $s_{tan}$), based on the transmission/reception power ratio data collected in various situations in which the human body is stationary.

The controller 140 may recognize the object according to example embodiments described above, by utilizing the data history included in the maximum sample interval ($T_{max}$, $s_{tan}$). For example, the controller 140 may immediately determine the human body as being present, when any one frequency domain data exceeds the first threshold or any one normalized data exceeds the tuning parameter during the maximum sample interval ($T_{max}$, $s_{tan}$).

When determining an object as being absent during the maximum sample interval, the controller 140 according to an example embodiment may transmit a wireless signal with the second power greater than the first power.

According to example embodiments described above, the electronic device 100_1 may set the maximum sample interval and utilize a data history in the maximum sample interval to recognize the object. Accordingly, the electronic device 100_1 may determine the object by effectively distinguishing between when the surrounding object is completely stationary (for example, a stationary object) or when the surrounding object is a movable object (for example, a human body).

Figure 5:
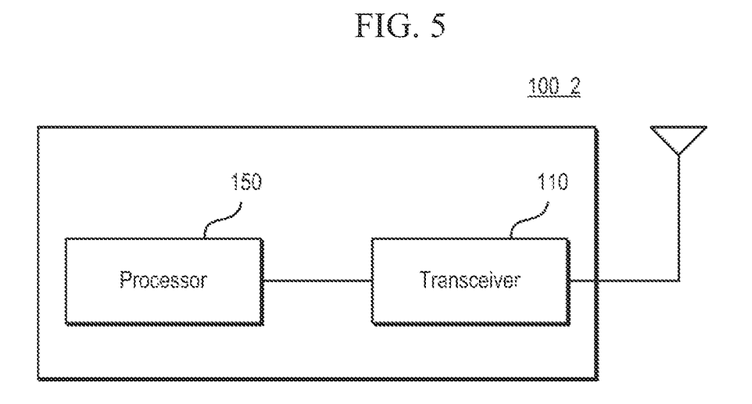
FIG. 5 illustrates an electronic device, according to another example embodiment.

FIG. 5 illustrates an electronic device, according to another example embodiment.

Referring to FIG. 5, according to another example embodiment, an electronic device 100_2 includes a transceiver 110 and a processor 150.

The transceiver 110 may transmit and receive a wireless signal and may correspond to the transceiver 110 of FIG. 1. The processor 150 is electrically connected to the transceiver 110 to control the transceiver 110 or to perform operations for controlling the transceiver 110.

At least one processor 150 may be provided to control the transceiver 110, and may be configured to implement the description, function, procedure, suggestion, method, and/or operation flowcharts of the present disclosure. For example, the processor 150 may receive a signal through the transceiver 110 and store information included in the signal or data in a memory. In addition, the processor 150 may process information stored in the memory to generate a signal, and then transmit the generated signal through the transceiver 110. The processor 150 may perform some or all of the processes controlled by the processor 150, or may perform various example embodiments, based on a memory having software code including instructions for performing descriptions, functions, procedures, suggestions, methods, and/or operating procedures of the present disclosure.

According to an example embodiment, the processor 150 may be configured to perform operations performed by at least one of the measurement circuit 120, the converter 130, and the controller 140 of FIG. 1, or operations of the electronic device according to various example embodiments described above. For example, the processor 150 may measure the transmission/reception power ratio from a wireless signal transceived by the transceiver 110, and may transform the transmission/reception power ratio into frequency domain data. The processor 150 may detect a near object based on the transformed frequency domain data and the adjustable threshold, and may control the transceiver 110, depending on the detection result of the object. For example, the processor 150 may control the transceiver 110 to transmit the wireless signal with first power or second power depending on whether the object is detected.

Figure 6:
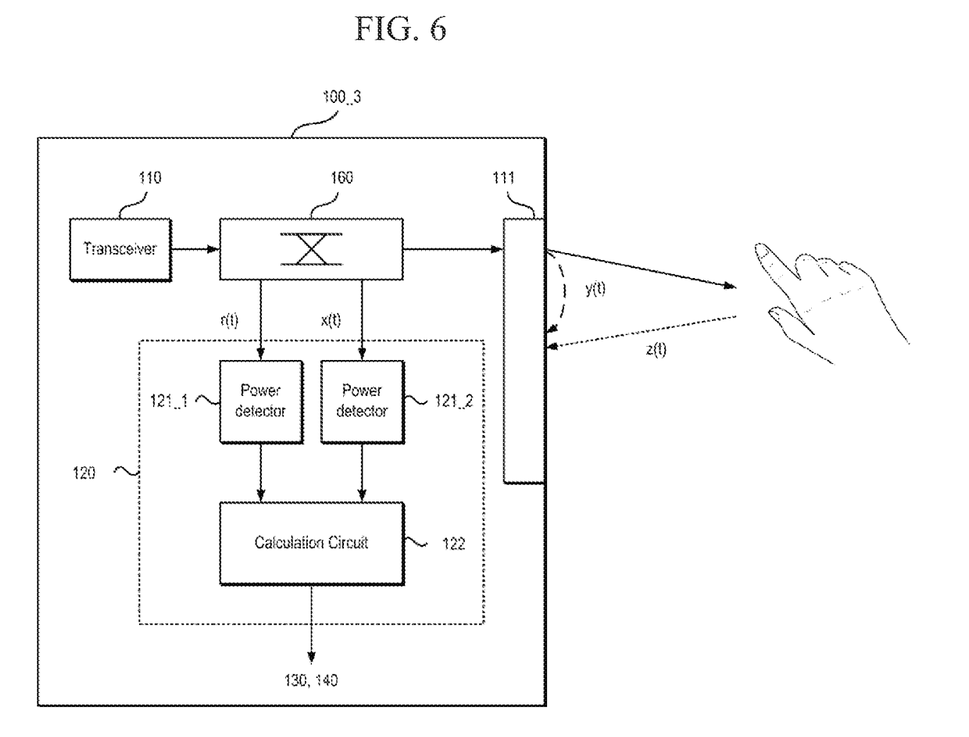
FIG. 6 illustrates an electronic device, according to another example embodiment.

FIG. 6 illustrates an electronic device, according to another example embodiment.

Referring to FIG. 6, an electronic device 100_3 according to various example embodiments includes a coupler 160 in addition to the transceiver 110, the antenna 111, and the measurement circuit 120 coupled to the converter 130, and the controller 140. The operations of the transceiver 110, the antenna 111, the converter 130, and the controller 140 correspond to those described above.

According to an example embodiment, the measurement circuit 120 may include a first power detector 121_1, a second power detector 121_2, and a calculation circuit 122. The first power detector 121_1 may be configured to detect the power of, for example, a reception signal, and the reception signal may include a reflection signal, a leakage signal, and any noise. The second power detector 121_2 may be configured to detect the power of, for example, a transmission signal. The calculation circuit 122 may calculate a transmission/reception power ratio, based on the power value of the reception signal and the power value of the transmission signal which are detected from the first power detector 121_1 and the second power detector 121_2.

According to an example embodiment, the coupler 160 may be interposed between the transceiver 110 and the antenna 111. The coupler 160 may be a bidirectional coupler, which extracts the transmission signal or the reception signal to be provided to the measurement circuit 120. For example, the coupler 160 may extract the transmission signal from the wireless signal transmitted and may provide the transmission signal to the first power detector 121_1. In addition, the coupler 160 may extract the reception signal from the wireless signal and may provide the reception signal to the second power detector 121_2.

As described above, according to various example embodiments, the electronic device may detect the object by utilizing the frequency domain data of the transmission/reception power ratio and the adjustable threshold, to control the power of the wireless signal to satisfy the power exposure regulation such as FCC, thereby efficiently making communication. In particular, according to example embodiments, the threshold is adaptively adjusted based on the change in the transmission/reception power ratio data resulting from the change in the terminal or the surrounding situations. In addition, as the threshold is adjusted, the detection rate of the object may be adjusted, such that the object, such as the human body, may be detected with higher sensitivity. In addition, according to example embodiments, the human body that is substantially stationary may be detected by utilizing the maximum sample duration, in order to distinguish the human body from an object.

Figure 7:
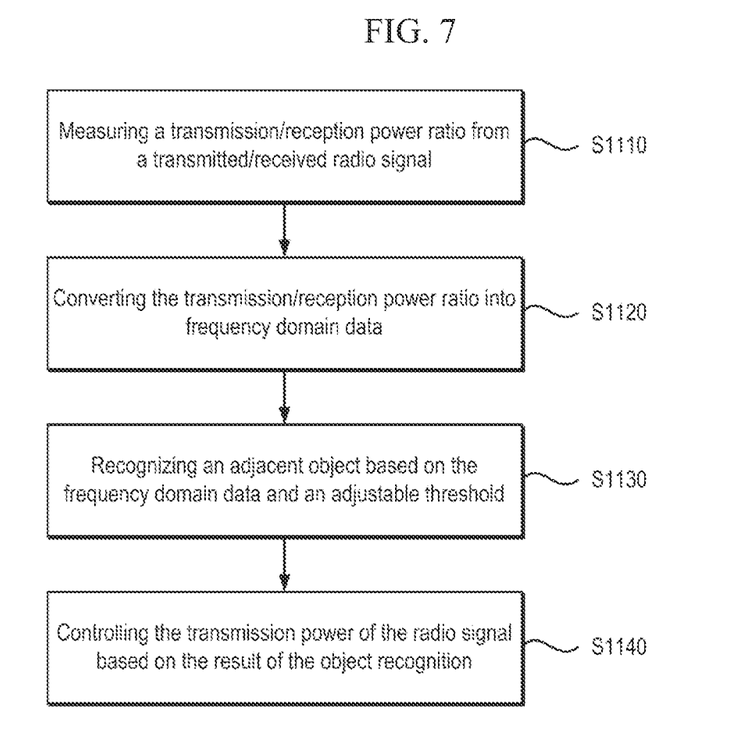
FIG. 7 is a flowchart illustrating an operating method of an electronic device, according to an example embodiment.

FIG. 7 is a flowchart illustrating an operating method of an electronic device, according to an example embodiment. Hereinafter, the duplication of the above description will be omitted to avoid redundancy.

Referring to FIG. 7, according to an example embodiment, the electronic device (e.g., one of the electronic devices 100_1, 100_2, and 100_3) measures the transmission/reception power ratio from the transmitted/received wireless signal (S1110). The measured transmission/reception power ratio may be data (time domain data) in a time domain. The electronic device may measure the transmission/reception power ratio, based on, for example, $E[|r(t)|^2]/(E[|x(t)|^2])$.

The electronic device transforms the measured transmission/reception power ratio into the frequency domain data (S1120). For example, the electronic device may transform the measured transmission/reception power ratio into the frequency domain data through the discrete Fourier transform.

The electronic device detects the adjacent object, based on the transformed frequency domain data and the adjustable threshold (S1130). For example, the electronic device may determine the object as being adjacent thereto, when the frequency domain data exceeds the adjustable threshold.

The electronic device controls transmission power of the wireless signal, depending on the detection result of the object in S1130 (S1140). For example, the electronic device may control the transceiver 110 to transmit the wireless signal with the first power when the object is detected in S1130 and to transmit the wireless signal with the second power greater than the first power, when the object is not detected.

Figure 8:
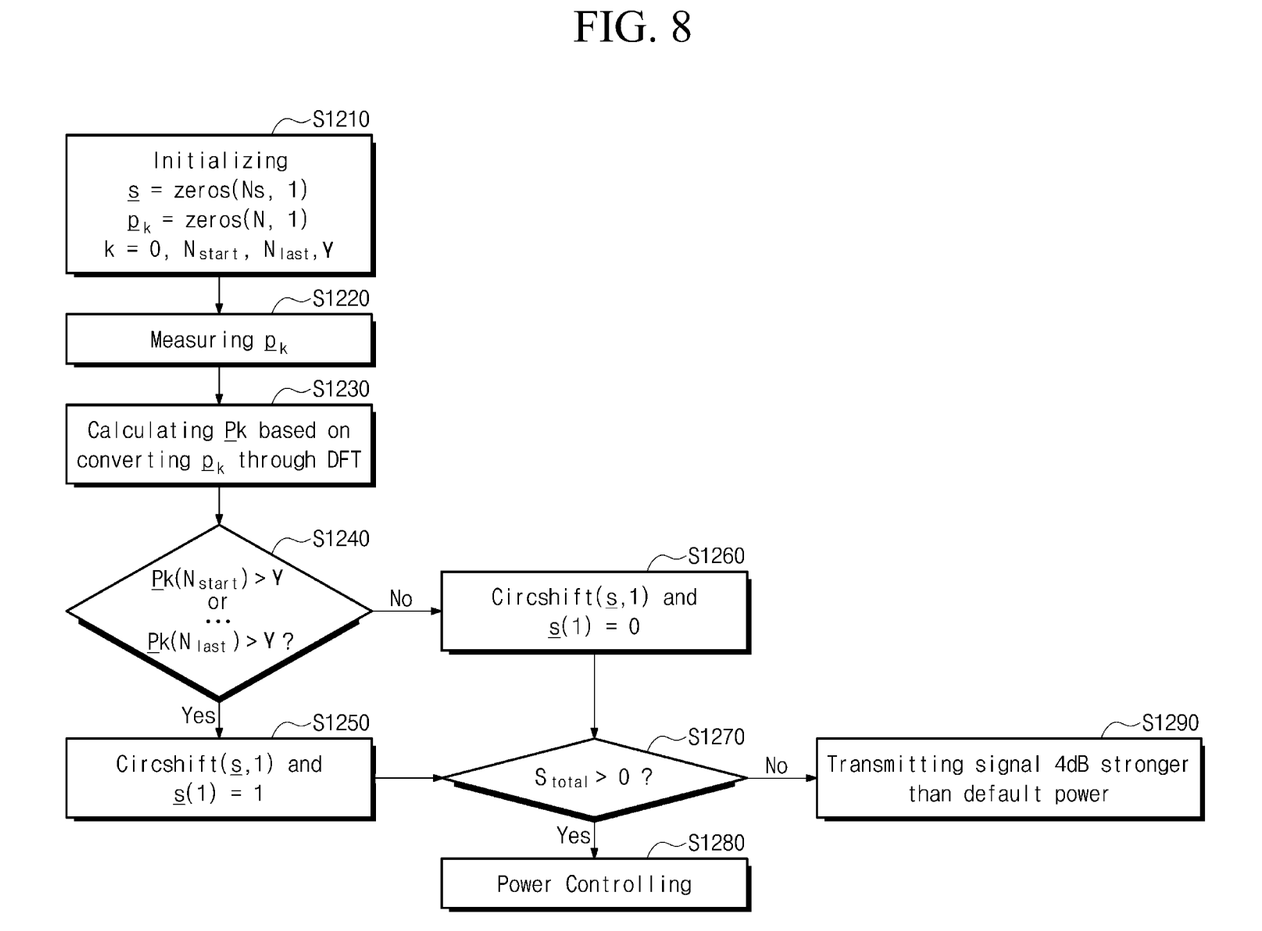
FIG. 8 is a flowchart illustrating an operating method of an electronic device, according to another example embodiment.

FIG. 8 is a flowchart illustrating the operating method of an electronic device, according to another example embodiment.

Referring to FIG. 8, according to another example embodiment, the electronic device (e.g., one of the electronic devices 100_1, 100_2, and 100_3) may initialize history vector "s" having the size of (Ns, 1) to "0", in which "Ns" denotes the number of data samples included in the history vector, may initialize the transmission/reception power ratio vector "pk" including the transmission/reception power ratio corresponding to a specific time window and having the size of (N, 1) to "0", in which "N" denotes the number of data samples included in the specific time window, and Ns>>N, and may set k, $N_{start}$, $N_{last}$, and a threshold γ (S1210).

In this case, the history vector "s" is a vector indicating whether the object is detected in the Ns data samples included in the history vector. In addition, the history vector "s" is defined as $p_k = [p[kT_s]p[(k+1)T_s] \ldots p[(k+n)T_s] \ldots p[(k+N-1)T_s]]^T$, in which "p[nTs]" denotes a transmission/reception power ratio serving as the n-th measurement result of the power, "k" denotes the integer equal to or greater than "0", and "Ts" denotes a sample interval.

According to an example embodiment, the electronic device may set "Ns" to satisfy "$T_{max,\ stan} = Ns*Ts$" which is the maximum sample duration.

The electronic device may set the threshold "γ" according to various example embodiments. For example, the electronic device may calculate a noise level, and may set the threshold "γ" defined by the noise level and the tuning parameter.

The electronic device may measure the transmission/reception power ratio vector "pk" (S1220)

The electronic device may transform the measured transmission/reception power ratio vector "pk" into "Pk" (S1230). For example, the electronic device may perform the transform into the frequency area through the DFT.

The electronic device compares the frequency domain data "Pk" transformed in the frequency area with the threshold "γ" (S1240). For example, the electronic device may sequentially compare $Pk(N_{start})$, ..., $Pk(N_{last})$, which are the frequency domain data transformed with respect to the range $N_{start}$ to $N_{last}$ included in "N" which is the specific time window "N".

When it is determined that the size of at least one of the frequency domain data ($Pk(N_{start})$, ..., $Pk(N_{last})$) exceeds the threshold "γ" in S1240, the electronic device may perform a circulation shift operation (Circshift) for the history vector "s", and the first value of the history vector "s" may be set as "1" (S1250).

When it is determined that the size of at least one of the frequency domain data ($Pk(N_{start})$, ..., $Pk(N_{last})$) does not exceed the threshold "γ" in S1240, the electronic devices 100_1, 100_2, and 100_3 may perform the circulation shift operation (Circshift) for the history vector "s", and the first value of the history vector "s" may be set "0" (S1260). In this case, the history vector "s" of "1" may indicate that the object is detected, and the history vector "s" of "0" may indicate that the object is not detected.

After S1250 or S1260, the electronic device may determine whether $s_{total}$ is greater than "0" (S1270). In this case, $s_{total}$ is may be defined as $$\sum_{n=1}^{Ns} \underline{s}(n).$$

When $s_{total}$ is determined as being greater than "0" in S1270, the electronic device may determine the object as being detected during "Ns," and control power (S1280). In particular, when "Ns is set based on the above-described maximum sample duration, and when $s_{total}$ is greater than "0", the electronic device may determine the human body as being detected, and may control the transceiver 110 to transmit the wireless signal with first power, which may comply with an exposure standard.

When $s_{total}$ is determined as being equal to or less than "0" in S1270, the electronic devices 100_1, 100_2, and 100_3 may determine the object as being not detected during "Ns," and may control the transceiver 110 to transmit the wireless signal with power (e.g., second power) greater than the basic power (e.g., the first power) by 4 dB (S1290). In particular, when "Ns" is set based on the above-described maximum sample duration, and when $s_{total}$ is determined as being equal to or less than "0", the electronic devices 100_1, 100_2, and 100_3 may determine the human body as not being detected, and may control the transceiver 110 to transmit the wireless signal with second power greater than the first power.

S1210 to S1270 may be iteratively performed, as "k" is increased by "1".

Figure 9:
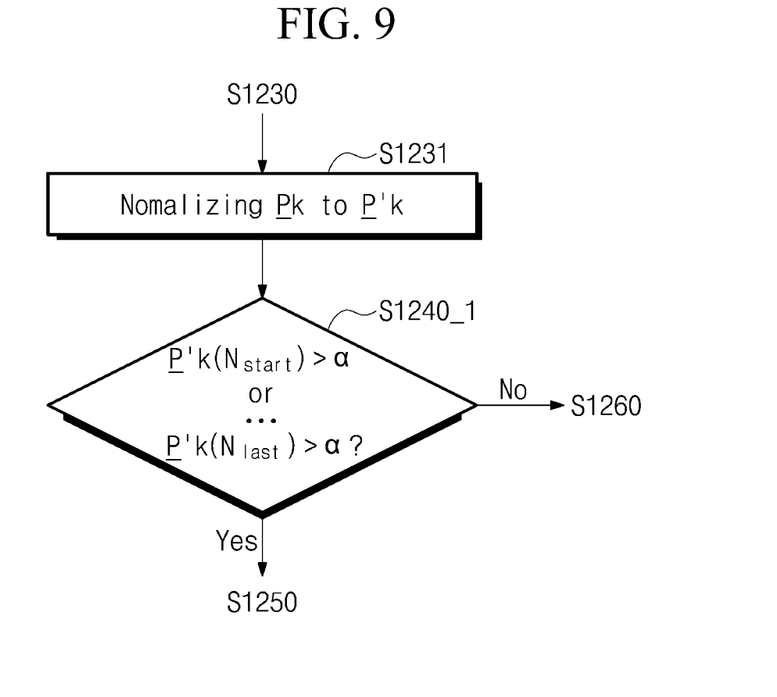
FIG. 9 is a flowchart illustrating an operating method of an electronic device, according to another example embodiment.

FIG. 9 is a flowchart illustrating the operating method of an electronic device, according to another example embodiment.

Referring to FIG. 9, according to another example embodiment, the electronic device (e.g., one of the electronic devices 100_1, 100_2, and 100_3) may additionally perform an operation of normalizing the frequency domain data, in addition to the operations of FIG. 8 (S1231). For example, the electronic device may obtain normalized data "P'k" by dividing the frequency domain data "Pk" by a noise level.

The electronic device may compare the obtained normalized frequency domain data "P'k" with the tuning parameter (S1240_1). For example, the electronic device may sequentially compare the transformed normalized data P'k ($N_{start}$), . . . , and P'k($N_{last}$) with the tuning parameter, during a time duration "$N_{start}$" to "$N_{last}$" included in a specific time window "N".

Thereafter, the electronic device may perform S1250 when any one normalized data exceeds the tuning parameter depending on the determination result. When all normalized data does not exceed the tuning parameter, the electronic device may perform S1260.

Figure 10:
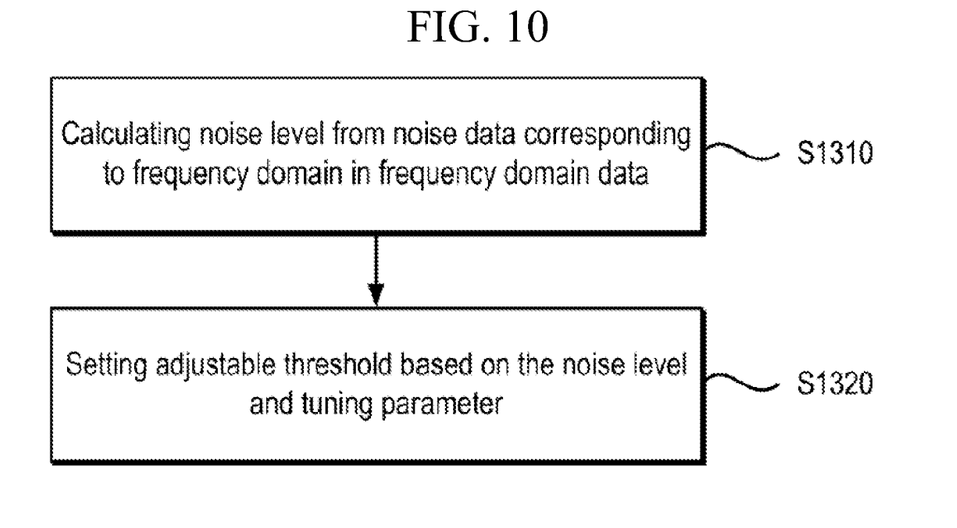
FIG. 10 is a flowchart illustrating a method of setting a threshold of an electronic device, according to an example embodiment.

FIG. 10 is a flowchart illustrating a method of setting a threshold of an electronic device, according to an example embodiment.

Referring to FIG. 10, according to an example embodiment, electronic device (e.g., one of the electronic devices 100_1, 100_2, and 100_3) calculates a noise level based on noise data, which corresponds to a noise frequency area, in the frequency domain data (S1310). For example, the electronic device may calculate the noise level through $$\text{noise}(\underline{P}_k) = \frac{1}{N_{noise}} \sum_{m=1}^{N_{noise}} \underline{P}_k(m)$$

based on the noise data included in the noise frequency area illustrated in FIG. 2B.

The electronic device may set an adjustable threshold based on the noise level and a tuning parameter (S1320). For example, the electronic device may adjust the detection rate of the object by adjusting the tuning parameter to set the threshold. For example, the electronic device may reduce a misdetection rate of the object by adjusting the tuning parameter to be a greater value, or may reduce an undetected rate of the object by adjusting the tuning parameter to be a lesser value.

Various example embodiments for the operating method of the electronic devices according to example embodiments have been described above. According to example embodiments, the object may be effectively detected by utilizing the frequency domain data of the power ratio and the adjustable threshold. Accordingly, the power of the wireless signal may be controlled to satisfy the power exposure regulation, such as FCC, thereby effectively making communication. In particular, according to example embodiments, the threshold may be adaptively adjusted based on the change in the transmission/reception power ratio data, which results from the change in the terminal situation or the surrounding situation. In addition, as the threshold is adjusted, the detection rate of the object is adjusted such that the object, such as the human body, is detected with higher sensitivity. In addition, according to example embodiments, the human body substantially stationary is detected while distinguishing with a thing by utilizing history data set with the maximum sample duration, and appropriate power control is performed.

As described above, example embodiments provide the electronic device for detecting an object, such as a human body, in a short distance, and an operating method thereof.

In addition, example embodiments provide an electronic device for controlling the power of the wireless signal to satisfy the power exposure standard for the object, when the object is detected, thereby effectively making communication, and an operating method thereof.

While aspects of example embodiments have been particularly shown and described, it will be understood that various changes in form and details may be made therein without departing from the spirit and scope of the following claims.

What is claimed is:

1. An electronic device comprising:
a transceiver configured to transmit and receive a wireless signal; and
a processor configured to:
control a measurement circuit to identify a transmission/reception power ratio of the wireless signal;
control a converter to transform the transmission/reception power ratio into frequency domain data;
detect whether an object is adjacent the electronic device, based on the frequency domain data and an adjustable threshold; and
control the transceiver based on whether the object is detected adjacent the electronic device.

2. The electronic device of claim 1, wherein the processor is further configured to:
identify a noise level based on noise data, which corresponds to a noise frequency bandwidth of the frequency domain data; and
set the adjustable threshold based on the noise level and a tuning parameter.

3. The electronic device of claim 2, wherein the processor is further configured to adjust the tuning parameter.

4. The electronic device of claim 2, wherein the processor is further configured to:
identify the object is adjacent the electronic device, based on the frequency domain data exceeding the adjustable threshold; and
identify the object is not adjacent the electronic device, based on the frequency domain data being equal to or less than the adjustable threshold.

5. The electronic device of claim 4, wherein the processor is further configured to:
transmit the wireless signal with first power, based on determining the object is adjacent the electronic device; and
transmit the wireless signal with second power, greater than the first power, based on determining the object is not adjacent the electronic device.

6. The electronic device of claim 5, wherein the second power is greater than the first power by 4 dB.

7. The electronic device of claim 4, wherein the processor is further configured to:
detect the object for a time period corresponding to a maximum stop time of a human body;
transmit the wireless signal with first power, based on identifying the object is adjacent the electronic device; and
transmit the wireless signal with second power, greater than the first power, based on identifying the object is not adjacent the electronic device for the time period.

8. The electronic device of claim 4, wherein the processor is further configured to identify the object is adjacent the electronic device, based on any one frequency component of the frequency domain data exceeding the adjustable threshold.

9. The electronic device of claim 2, wherein the processor is further configured to:
transform the frequency domain data into normalized data based on the noise level;
identify the object is adjacent the electronic device, based on the normalized data exceeding the tuning parameter; and
identify the object is not adjacent the electronic device, based on the normalized data being equal to or less than the tuning parameter.

10. The electronic device of claim 1, wherein the processor is further configured to control the converter to transform the transmission/reception power ratio into the frequency domain data through Discrete Fourier Transform (DFT).

11. An operating method performed by an electronic device, the operating method comprising:
   identifying a transmission/reception power ratio of a wireless signal;
   transforming the transmission/reception power ratio into frequency domain data;
   detecting whether an object is adjacent the electronic device, based on the frequency domain data and an adjustable threshold; and
   controlling transmission power of the wireless signal, based on whether the object is detected adjacent the electronic device.

12. The operating method of claim 11, further comprising:
   identifying a noise level based on noise data, which corresponds to a noise frequency bandwidth of the frequency domain data; and
   setting the adjustable threshold based on the noise level and a tuning parameter.

13. The operating method of claim 12, further comprising adjusting a detection rate by adjusting the tuning parameter.

14. The operating method of claim 11, wherein the detecting the object comprises:
   identifying the object is adjacent the electronic device, based on the frequency domain data exceeding the adjustable threshold; and
   identifying the object is not adjacent the electronic device, based on the frequency domain data being equal to or less than the adjustable threshold.

15. The operating method of claim 14, wherein the controlling the transmission power comprises:
   transmitting the wireless signal with first power, based on identifying the object is adjacent the electronic device; and
   transmitting the wireless signal with second power, greater than the first power, based on identifying the object is not adjacent the electronic device.

16. The operating method of claim 14, wherein the detecting the object comprises detecting the object for a time period corresponding to a maximum stop time of a human body.

17. The operating method of claim 12, further comprising transforming the frequency domain data into normalized data based on the noise level,
   wherein the detecting of the object comprises:
      identifying the object is adjacent the electronic device, based on the normalized data exceeding the tuning parameter; and
      identifying the object is not adjacent the electronic device, based on the normalized data being equal to or less than the tuning parameter.

18. An electronic device comprising:
   a transceiver configured to transmit and receive a wireless signal; and
   a processor configured to:
      measure a transmission/reception power ratio of the wireless signal;
      transform the transmission/reception power ratio into frequency domain data;
      detect whether an object is adjacent the electronic device, based on the frequency domain data and an adjustable threshold; and
      control the transceiver based on whether the object is detected adjacent the electronic device.

19. The electronic device of claim 18, wherein the processor is further configured to:
   identify a noise level based on noise data, which corresponds to a noise frequency bandwidth of the frequency domain data; and
   set the adjustable threshold based on the noise level and a tuning parameter.

20. The electronic device of claim 19, wherein the processor is further configured to adjust the tuning parameter.

* * * * *